United States Patent [19]
Helbig et al.

[11] Patent Number: 4,797,008
[45] Date of Patent: Jan. 10, 1989

[54] ROLLER BEARING FOR ROTARY OR LINEAR APPLICATIONS

[75] Inventors: Michael Helbig, Bopfingen; Heinrich Staudt, Aalen, both of Fed. Rep. of Germany

[73] Assignee: Franke & Heydrich KG, Aalen, Fed. Rep. of Germany

[21] Appl. No.: 107,692

[22] Filed: Oct. 9, 1987

[51] Int. Cl.⁴ .......................... F16C 29/04; F16C 33/61
[52] U.S. Cl. ...................................... 384/49; 384/501; 384/615
[58] Field of Search ................. 384/49, 501, 615, 569, 384/513, 515, 505, 506

[56] References Cited

U.S. PATENT DOCUMENTS 1,201,328 10/1916 Moran .................................. 384/501
3,144,278 8/1964 Pohler et al. ....................... 384/501
4,696,586 9/1987 Krug ..................................... 384/49

FOREIGN PATENT DOCUMENTS 1962776 6/1971 Fed. Rep. of Germany .

Primary Examiner—Lenard A. Footland
Attorney, Agent, or Firm—Herbert Dubno

[57] ABSTRACT

A bearing utilizing a plurality of wires has the races for the roller bodies provides individual lining strips between each wire and the groove walls of the receiving structural members of the bearing. These lining strips are braced in two mutually perpendicular directions against two mutually perpendicular countersurfaces of the grooves and a yieldable connection can be provided between the pair of lining strips in one or both of the grooves so that the bearing prestress and play can be adjusted.

7 Claims, 3 Drawing Sheets

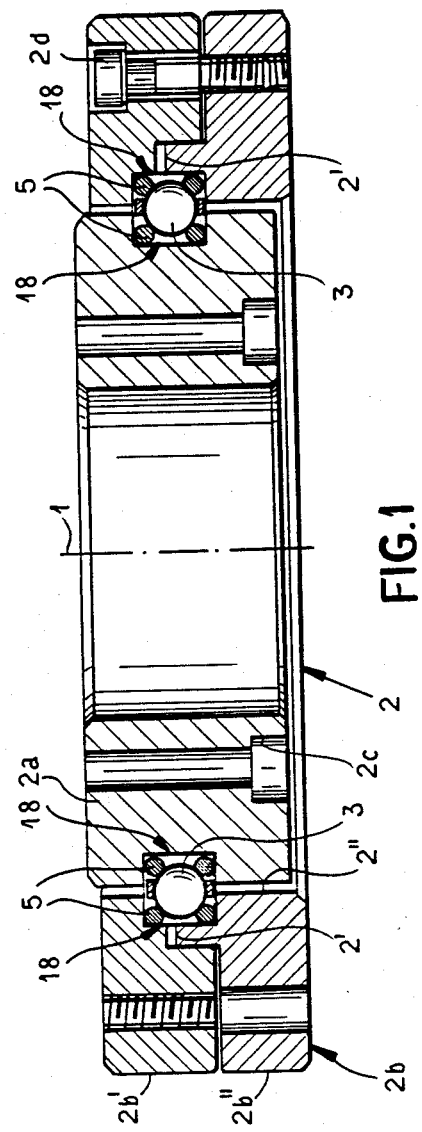
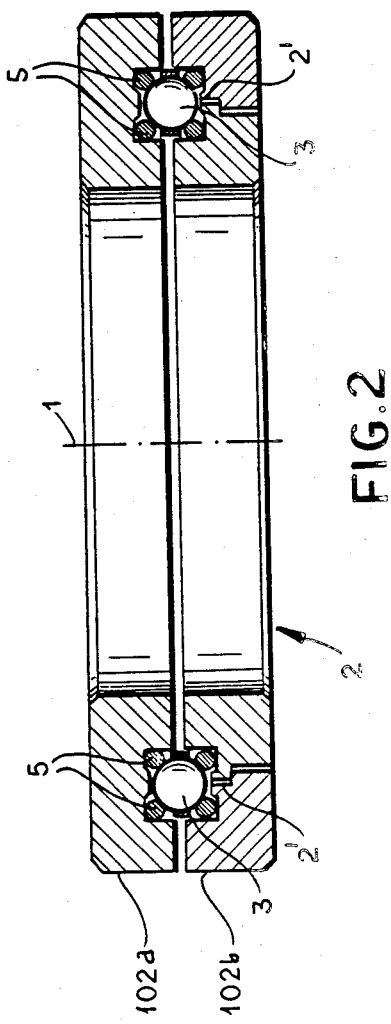

ROLLER BEARING FOR ROTARY OR LINEAR APPLICATIONS

FIELD OF THE INVENTION

Our present invention relates to a roller bearing and, more particularly, to a roller bearing for use in rotary and linear applications. More specifically, the invention relates to a roller bearing which comprises roller bodies received in a channel between relatively displaceable members or races which are uniformly spaced from one another and which also comprises a bed formed by wires extending along the path of the roller bodies and by means of which the roller bodies are braced against the race parts.

BACKGROUND OF THE INVENTION

Roller bearing systems of the aforedescribed type (see German Patent document-Open Application 1,962,776) can be referred to as wire roller bearings because the actual running surfaces or races for the roller bodies are formed by a bed constituted by a plurality of wires which extend along the path of the roller bodies and are interposed between the roller bodies and the structural members of the bearing which are relatively displaceable.

The latter members may be rings in the case of a roller bearing in an annular configuration or may be bars in the case of a roller bearing used in a linear construction.

In conventional wire roller bearings, the wire races, hereinafter referred to also as running wires, are in direct engagement with the receiving structure, i.e. the structure forming the channel. In the latter document a liner of sorts is provided between the wires and the member.

In practice, the structure against which the running wires of the bed are braced determines the precision of the roller path and the quality of the bearing.

Defects in the fabrication of the support structure for the running wires of the bed or in the fabrication of the bed or the ability of the running wire bed to accommodate to the geometry of the support structure all have an adverse effect on the quality of the bearing.

Similarly, load and temperature effects which develop during operating act detrimentally on the bearing by deformation of the running wire bed because the running wires themselves have no significant intrinsic stiffness and hence the wire configuration is effected by these phenomenon which act upon the receiving structure.

Furthermore, in many cases the bed formed by the channel in which the running wires are provided are fabricated with different tolerances than that required by the running wire configuration so that the geometry at the contact zones of the running wires with this bed is not satisfactory.

For example, instead of large zones of contact between the wires and the supporting surfaces of the bed, the zones of contact may be small with high specific loading at the contact locations. This can result in critical deformations, setting characteristics and premature development of play depending upon the softness of the material from which the bed is constructed.

It has been proposed to overcome or reduce these drawbacks by providing increased areas of contact and thus better fitting of the parts together or by surface compaction or increased density of the contact surface between the bed and the running wires.

For bearing manufacturers with the knowhow to compensate for these drawbacks, this does not pose a problem although for others, especially those who may have to procure units formed by the running wires, the roller bodies and the roller cage, from the manufacturer and instal such units in bearings other than in the course of standardized bearing manufacture, the problems described can be insurmountable since similar knowhow is not available. As a consequence, in many cases inadequate bearing structures may be provided, defects in the bearings which are provided can arise and the developed response to the problems described cannot be adequately exploited.

OBJECTS OF THE INVENTION

It is, therefore, the principal object of the present invention to provide a roller bearing for use in an annular or rotary configuration or in a linear configuration such that the aforedescribed problems relating to the accommodation of the running wire bed to the running wires can be avoided.

Another object of our invention is to provide a roller bearing of the type described which can be easily fabricated, will have a high degree of precision and will also have a long useful life.

SUMMARY OF THE INVENTION

These objects and others which will be apparent hereinafter are attained in accordance with the invention, in a roller bearing in the form of a rotary or linear guide in which a plurality of roller bodies have constant spacing from one another and roll on races extending in the guide direction, i.e. the direction in which one of the bearing members can move relative to the other bearing member.

The races are formed by race wires, each of which lies in a race-wire bed provided in bearing grooves in these members which can be rings (in the case of a rotary bearing) or bars (in the case of a linear bearing) which are separated by the bearing gap and constitute the structural members enclosing the roller bodies.

In the bearing grooves between the groove walls and the race wires and extending along the race wires are lining strips which have inner sides turned toward the race wires, form-identical to the race wires and shaped to constitute the respective race-wire beds.

The lining strips have outer contact surfaces resting in form-fitting engagement with countersurfaces on or formed by the groove walls. The countersurfaces brace the lining strips in two mutually perpendicular directions, both of which are perpendicular to the guide direction, and which respectively are transverse to and along the bearing gap.

According to the present invention, each guide strip forms only a single race wire bed for a respective race wire, the guide strips are provided in pairs in the bearing groove and each structural member with a spacing from one another, and the pairs of guide strips are so constructed and arranged that selectively a mutual approximation and separation of the guide strips of at least one of the pairs in a respective one of the grooves is possible to permit adjustment of the prestress applied to the roller bodies of the bearing.

According to a feature of the invention, means can be provided for yieldably connecting the lining strips which have the selectively variable spacing therebetween, such means being, for example, a hook connection between the two lining strips in a respective one of the grooves permitting relative displacement of the two lining strips toward one another but limiting their separation from one another.

In another alternative, the means for yieldably connecting the lining strips can be a fold which is formed in one piece with the two lining strips connected thereby.

The fold can be inwardly concave so as to receive a cage spacing the roller bodies from one another.

For increased flexibility, for example, the fold can be formed with openings. Other flexible web connections between the two lining strips which can be shifted toward one another to increase the bearing stress upon the roller bodies in one of the grooves can also be used and, of course, in that case such webs can be bent inwardly or outwardly as desired.

The bearing construction of the invention has the advantage that the beds for the race wires can be fabricated with precision and especially high tolerances because they can be formed in high quality sheet metal which can be of high strength and little tendency to deform. The lining strips compensate for manufacturing tolerances of the more massive structural members.

The lining strips hold the roller bodies in an assembly which can be inserted as a unit into the grooves of the structural members so that even an unskilled individual can readily assemble a bearing of high precision.

The adjustability allows practically complete elimination of play and the use of the race wires and the respective lining strips eliminates local setting and stress which can give rise to increased play with use.

Wear is reduced.

Since each of the lining strips individual to a respective race wire and forming the race wire bed therefore must, in accordance with the invention, lie in surface contact with two groove walls which are mutually perpendicular to one another, in the case of a roller bearing, one of these walls can be a cylindrical wall while the other is a wall perpendicular to the axis or generatrix of the cylindrical wall.

In the linear configuration of the bearing, the two walls extend linearly parallel to the guide direction.

The bed formed by each strip is advantageously curved with a radius of curvature corresponding to the radius of curvature of the outer surface of the race wire and, of course, centered on the axis thereof. In the case of a rotary bearing, the axis of each race wire is itself a circle and the surface of the bed corresponds to a surface of a torus.

In the case of a linear bearing, of course, the surface will correspond to a surface of a cylinder whose axis corresponds to the axis of the race wire.

According to a further feature of the invention, one or both of the groove-forming members which are relatively displaceable in the guide direction is itself split into two relatively displaceable parts which can be drawn in the direction in which the two lining strips can be moved together to increase the pressing force upon the roller bodies. This affords adjustability of the bearing play even in the case where the race wires and the roller bodies form a prefabricated unit which can be inserted between the structural members and into the grooves.

BRIEF DESCRIPTION OF THE DRAWING

The above and other objects, features and advantages of the present invention will become more readily apparent from the following description, reference being made to the accompanying drawing in which:

FIG. 1 is an axial section through a rotary bearing of the radial type illustrating principles of the invention;

FIG. 2 is an axial section through a rotary bearing of the axial or thrust-bearing type in accordance with the invention;

SPECIFIC DESCRIPTION

Figure 3:
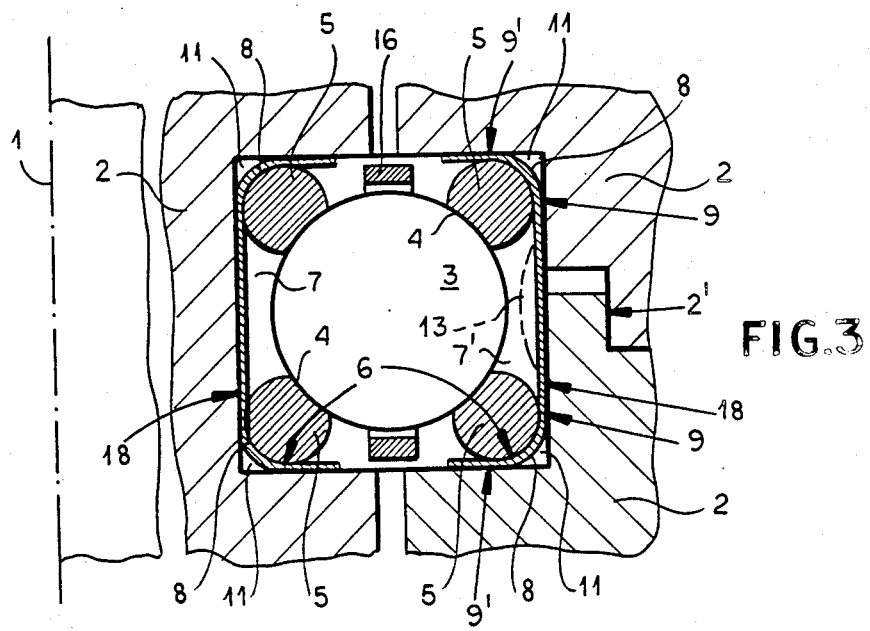
FIG. 3 is an enlarged cross section of the embodiment of FIG. 1.

In the drawing, we have only illustrated ball bearings of the rotary type, although it will be understood that the same principles apply to roller bearings in which the roller bodies are pins, ellipsoids of revolution, cylindrical roller elements and conical or tapered roller elements In the best mode embodiment of the invention, however, balls constitute the roller bodies.

Figure 4:
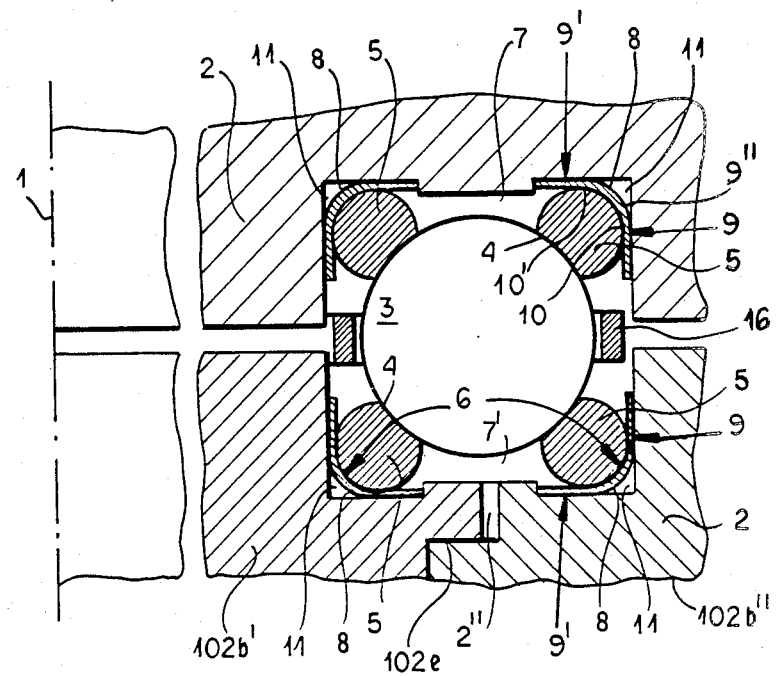
FIG. 4 is an enlarged cross section of the embodiment of FIG. 2.

While the best mode embodiment of the invention is a ball bearing of the rotary type, it will be understood that linear bearings in accordance with the invention utilize the same principles and indeed the cross section through such a bearing can correspond in all respects to that of FIG. 4.

In FIG. 1 a rotary radial bearing is shown to have an axis 1 and two structural members 2a and 2b, constituting respectively the inner bearing member which can be mounted on a shaft or hub, e.g. by bolt holds 2c, and upon a housing, respectively. Between these members 2a and 2b, a bearing gap 2″ is provided.

The outer bearing part 2b may, in turn, be subdivided into two parts 2b′ and 2b″, separated by a gap 2′ and adapted to be drawn together by bolts or screws, one of which is shown at 2d in FIG. 1. Similar means can be used to draw together the parts of the bearing members illustrated in the other embodiments as well, even though such means may not be illustrated in each embodiment.

By adjusting the width of the gap 2′, as will be described, the bearing play and the bearing prestress will be adjusted.

In the embodiments of FIGS. 1, 3, 5 and 6, the bearing gap or separation is in the radial direction, the respective bearings being so-called rotary radial bearings.

In the embodiments of FIGS. 2 and 4, the bearing gap is essentially axial, the respective bearings being so-called thrust bearings.

The two members 2a and 2b or 102a, 102b, of the bearing in each case are relatively displaceable in a guide direction. In the case of a linear bearing utilizing the configuration of FIG. 4, for example, this direction is perpendicular to the plane of the paper.

In all of the rotary bearings illustrated, this direction is about the axis of rotation 1. Friction between the members is minimized by the presence of the array of equispaced roller bodies 3 in which the illustrated embodiments are ball bearings. The ball bearings may be separated from one another by a conventional cage shown only in section at 16.

Each ball bearing 3 rides on a race 4 formed by four race wires 5, and, particularly on inwardly turned surfaces of these race wires whose curvatures correspond to the curvatures of the ball. The races 4 thus extend tangentially to the ball bearing circle.

Each of the race wires, in turn, lies in and is supported by a respective race wire bed 6 in a pair of bearing grooves 7 and 7' formed by the members 2a, 2b or 102a, or 102b, of the structure 2. This numeral is used to represent the bearing structure receiving the units formed by the race wires, the bearing balls and the cage, respectively. In the bearing grooves between the groove walls and the race wires 5, for each of these wires there is provided a respective lining strip 8. In the case of rotary bearings, each lining strip forms a lining ring. The inwardly facing side of each lining 8 forms the bed 6 for the respective race wire 5 and can be calibrated to be form-identical to the surface of the race wire 5 seated thereagainst.

The outer side of each lining strip 8 is turned toward the groove walls and is formed by contact surfaces 9, 9' which lie in form-fitting manner against the surfaces 10 and 10' of the groove wall so oriented that these countersurfaces 10, 10' and the contact surfaces 9 and 9' brace the lining strip 8 in two mutually perpendicular directions which are also perpendicular to the guide direction, namely, in a direction transverse to and in a direction along the bearing gap 2'. In the case of a rotary bearing, therefore, each lining strip is braced both in the axial direction and in the radial direction.

The contact surfaces 9, 9' and the countersurfaces 10, 10' formed in and by the groove walls can be fabricated in a simple manner even when the members 2 in which they are formed must be comparatively complicated, large and/or heavy elements such as housings, shafts or parts thereof.

Since the countersurfaces 10 and 10' run respectively perpendicular and in a plane parallel to the guide direction, machining of the groove 7 and 7' is comparatively simple.

Each of the grooves 7, 7' includes a pair of guide strips 8 so that in total, each ball is supported by so-called four-point support.

Each of the individual lining strips then has at least two such contact surfaces 9, 9' can engage two mutually perpendicular countersurfaces 10 and 10' associated with each lining strip.

The contact surfaces 9 and 9' of each strip do not directly adjoin one another but are separated by a bend while the respective countersurfaces 10 and 10' can adjoin one another at a right angle. As a consequence, between each bend 9' and the walls of the respective groove, a free space 11 of a generally triangular cross section can be formed.

In other words, the profiles or cross sections of the bearing grooves 7 and 7' need not conform to the outer profiles of the cross sections of the guide strips.

The contact surfaces 9 and 9' are generally tangential to the peripheries of the roller bodies 3.

By supporting the race or bodies in this fashion, it can be ensured that a deformation of the beds 6 under the effect of bearing forces even where hollows 11 are provided, need not be feared.

In the case of a rotary bearing as shown, one of the countersurfaces 10 is cylindrical, while the other countersurface 10' lies in a plane perpendicular to the axis of the cylinder.

For a linear bearing, both of the countersurfaces 10 and 10' are planar.

In the embodiment of FIGS. 2 and 4, the guide strips 8 are all spaced from one another and within each groove 7 or 7', the pair of lying strips are likewise spaced from one another and can be brought closer together by moving the two parts 2, 102b' and 102b" toward one another, e.g. by bolts which are functionally similar to the bolts 2d previously described, or by other radial force-generating means.

The relationship between the pairs of strips, therefore, is such that the strips of each pair are displaceable for adjustment of the bearing prestress. A yieldable connection between the two lining strips of each pair can be provided by permitting the gap 2" to be increased or decreased by deformation of the part 102e of member 102b".

Other forms of yieldable connections may be provided.

For example, a hook-shaped connection 11 is provided between the lining strips 8 and one pair which permits the strips to be moved toward one another but limits the degree to which they are moved apart. In this embodiment, moreover, (see also FIG. 3), an inward bulge 13 or 14 may be provided to permit the two lining strips, which are integrally formed with the connecting bulge, to be brought closer together. The bulge has been shown in broken lines in FIG. 3.

Figure 5:
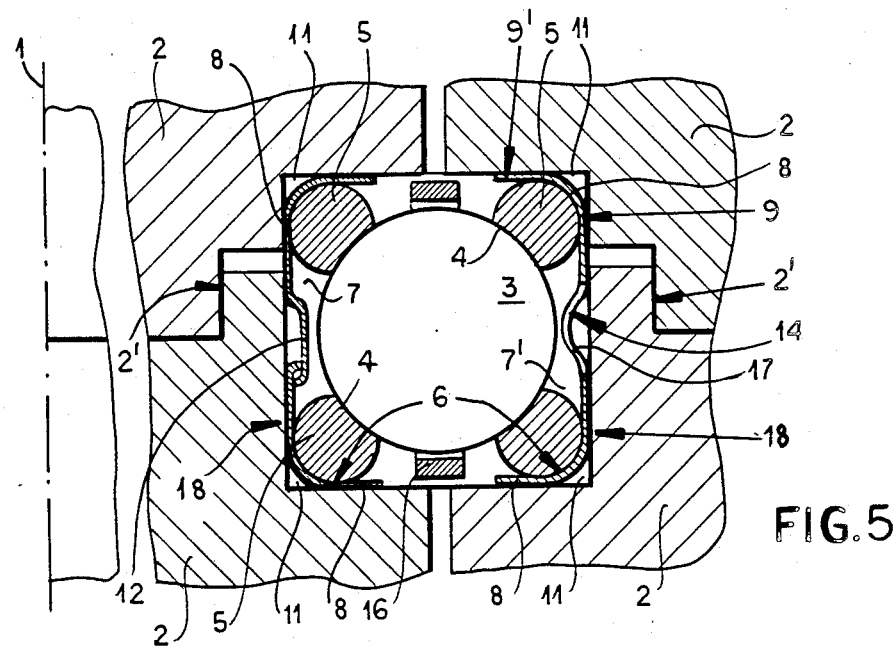
FIG. 5 is a view similar to FIG. 3 showing another embodiment of a radial bearing.

The bulge 14 in FIG. 5 is shown as an inwardly directed fold and windows 17 can be spaced apart along the fold to increase its flexibility.

Figure 6:
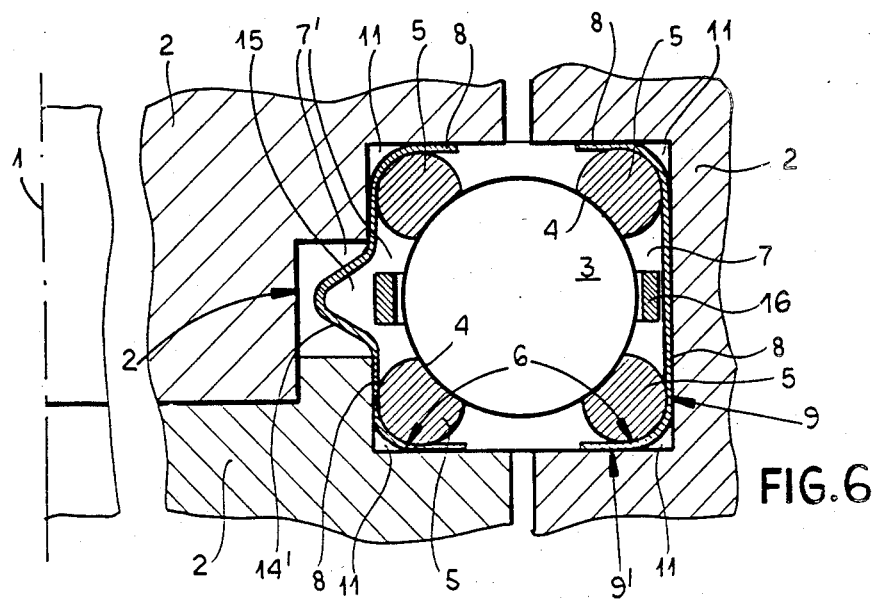
FIG. 6 is another view similar to FIG. 3 illustrating still a further embodiment of a radial bearing according to the invention.

In FIG. 6, the fold 14' is shown to extend outwardly to leave a space 15 in which the cage 16 of the bearing is provided.

In all of the embodiments, the race wires 5, the cage 16, the balls 3 and the lining strips 8 form a compact unit which can be inserted into the members 2 to form a high precision bearing without particular concern for the tolerances in manufacturing of these members 2.

We claim:

1. A rolling bearing, comprising:
    a pair of juxtaposed relatively displaceable bearing members relatively shiftable in a guide direction, separated by a bearing gap extending in said direction, and formed with respective mutually registering bearing grooves;
    a pair of race wires received in each of said grooves;
    an array of rolling bodies uniformly spaced in said direction rolling upon riding surfaces of said race wires; and
    a respective lining strip individual to each of said wires interposed between the respective wire and the respective member, each of said lining strips:
        having an inner side turned toward the respective race wire and form-identical to the respective race wire and shaped to form a bed in surface contact with the respective race wire all along the length thereof,
        having an outer side forming respective contact surfaces lying in form-fitting engagement with countersurfaces on walls of the respective groove bracing the respective lining strip in two mutually perpendicular directions both of which are perpendicular to said guide direction and which are respectively transverse to and along said bearing gap, and
        each of said lining strips in at least one of said grooves being spaced from the other lining strip in said one of said grooves with a selectively variable spacing therebetween.

2. The rolling bearing defined in claim 1, further comprising means for yieldably connecting the lining strips spaced with a selectively variable spacing therebetween.

3. The rolling bearing defined in claim 2 wherein said means for yieldably connecting the lining strips spaced with a selectively variable spacing therebetween includes a hook connection between the two lining strips in said one of said grooves permitting relative displacement of said two lining strips toward one another but limiting their separation from one another.

4. The rolling bearing defined in claim 2 wherein said means for yieldably connecting the lining strips spaced with a selectively variable spacing therebetween includes a web defining a fold and constituted in one piece with said two lining strips.

5. The rolling bearing defined in claim 4 wherein said fold has an inwardly concave side, said rolling bearing further comprising a cage spacing said rolling bodies from one another and extending into said fold.

6. The rolling bearing defined in claim 4 wherein said fold is formed with openings.

7. The rolling bearing defined in claim 4 wherein said means for yieldably connecting the lining strips spaced with a selectively variable spacing therebetween includes a web formed with openings.

* * * * *